H. A. MEARS.
Stovepipe Joint.
No. 95,921.
Patented Oct. 19, 1869.
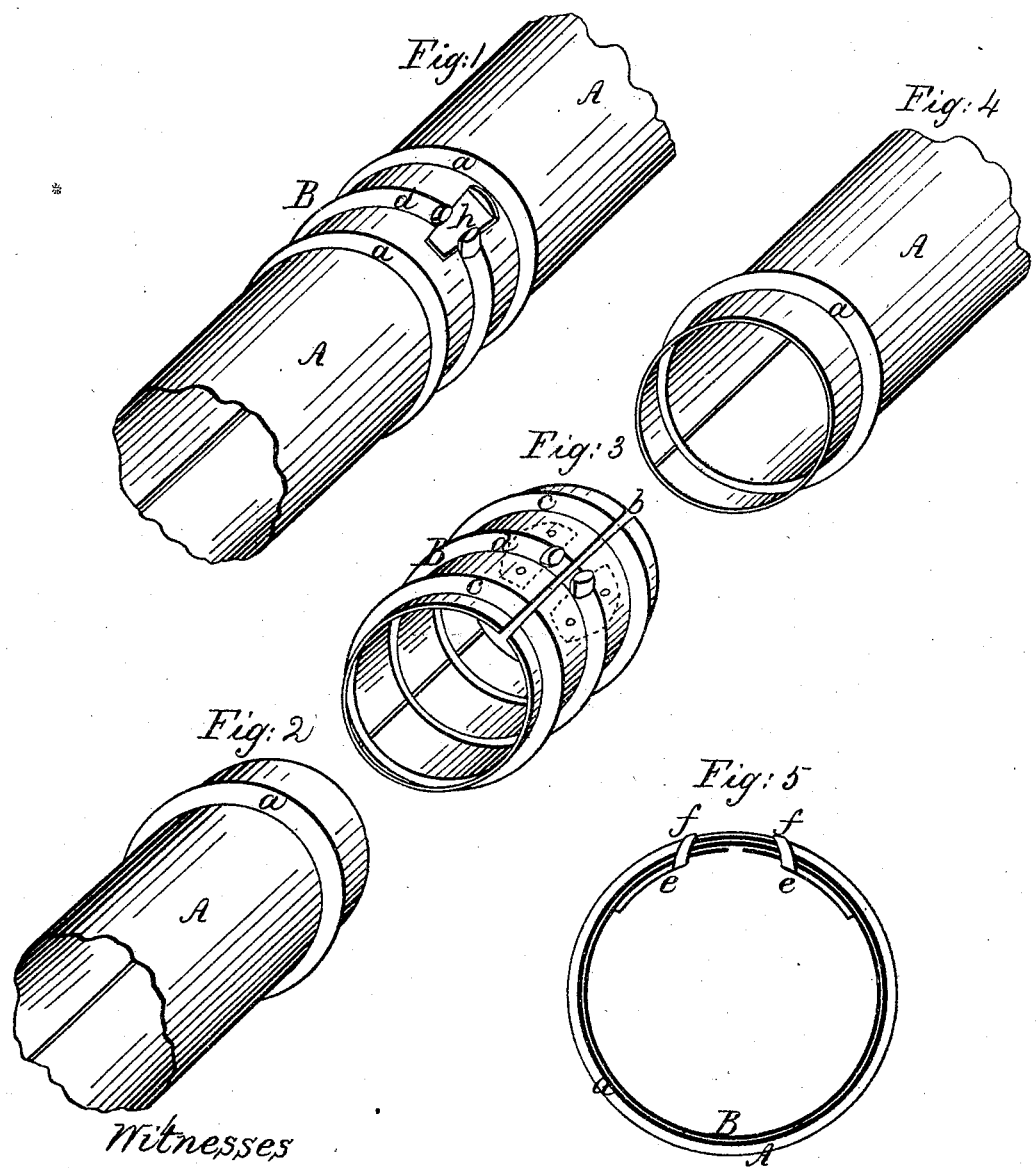

UNITED STATES PATENT OFFICE.

HORACE A. MEARS, OF PECATONICA, ILLINOIS.

Letters Patent No. 95,921, dated October 19, 1869.

STOVE-PIPE.

The Schedule referred to in these Letters Patent and making part of the same.

*To all whom it may concern:*

Be it known that I, HORACE A. MEARS, of Pecatonica, in the county of Winnebago, and State of Illinois, have invented a new and improved Mode for Securing the Joints in Stove, Stack, and other similar Pipes; and I do hereby declare that the following is a full and exact description thereof, reference being had to the accompanying drawings, and the letters of reference marked thereon, making part of this specification, in which—

Figure 1 represents portions of a stove-pipe joined together, embodying my invention.

Figures 2, 3, and 4, represent the same disengaged.

Figure 5 represents a transverse section through the joint.

Similar letters of reference represent corresponding parts in all the figures.

The object of my invention is to provide a simple and effective fastening for the joints of stove-pipe, and also by means of which they can be secured in the collars of flues.

A A, &c., represent portions of a pipe of usual construction, in which $a$ represents a raised bead near the ends thereof.

B B, &c., represent a supplemental joint-piece of smaller size.

This piece is open in the direction of its length, as at $b$, fig. 3, and has raised beads $c\ c$, near its ends, made to fit into the inside of raised beads $a\ a$, in A A, &c.

There is also a raised bead, $d$, about the centre of its length, and the space between the raised beads is about equal to the distance from the beads $a\ a$, in A A, to the ends thereof.

To the inside of B B, &c., are secured the plates $e\ e$, with prominences $f\ f$, which pass up through the joint-piece B, in openings prepared for them in the bead $d$, near the open edge thereof, and as represented at fig. 5, and in dotted lines in fig. 3.

The prominences $f\ f$ are inclined toward each other, and form jaws, between which is inserted the wedge $h$, as at fig. 1.

The pipe proper, as at A A, is constructed of equal size throughout its length.

In jointing the pipe, the joint-piece B, fig. 3, is passed into the ends of A A, figs. 2 and 4, until the beads $c\ c$, in B, drop into beads $a\ a$, in A A, figs. 2 and 4, after which the wedge $h$ is passed in between the jaws $f\ f$, which forces the joint-piece B outward against the pipe proper, and the beads are forced into each other, when the pipe will appear as at fig. 1, complete in the joint.

I also use this device to secure the pipe in the thimbles in flues, in which case I construct the thimble as the end of a joint of pipe with raised bead near its outer end, to secure the joint-piece B, in which it is secured by a wedge, in the same manner as the joints in the pipe are secured.

Thus far I have described my invention in connection with stove-pipes and flue-thimbles; but it is evident that it may be used for jointing other than stove-pipes, such as stack-pipes, hot-air pipes, &c., without departing from the principles involved in my invention.

Having thus described my invention,

What I claim as new, and desire to secure by Letters Patent, is—

The supplemental open joint B, with beads $c\ c\ d$, plates $e\ e$, and prominences $f\ f$, when operated by means of the wedge $h$, and used in connection with the pipe A A, as and for the purpose described.

Witnesses:            HORACE A. MEARS.

JACOB BEHEL,
  RUFUS C. BAILEY.